United States Patent
Happel et al.

(10) Patent No.: US 6,979,148 B2
(45) Date of Patent: Dec. 27, 2005

(54) GOLF COURSE GREEN STORM WATER FILTER

(76) Inventors: Henry Happel, 140 Ruby St., Rockledge, FL (US) 32955; Thomas H. Happel, 5041 Scott Rd., Cocoa, FL (US) 32926

( * ) Notice: Subject to any disclaimer, the term of this patent is extended or adjusted under 35 U.S.C. 154(b) by 0 days.

(21) Appl. No.: 10/995,864

(22) Filed: Nov. 23, 2004

(65) Prior Publication Data

US 2005/0069386 A1 Mar. 31, 2005

Related U.S. Application Data

(63) Continuation of application No. 10/385,929, filed on Mar. 11, 2003, now abandoned.

(51) Int. Cl.[7] .............................................. E02B 11/00
(52) U.S. Cl. ......................................... 405/43; 405/36
(58) Field of Search ............................. 405/36, 39, 40, 405/41, 43–45

(56) References Cited

U.S. PATENT DOCUMENTS

| | | | |
|---|---|---|---|
| 1,532,013 A * | 3/1925 | Winans | ....................... 210/316 |
| 4,756,643 A | 7/1988 | Hurley | |
| 5,405,539 A * | 4/1995 | Schneider | .................... 210/163 |
| 5,458,436 A | 10/1995 | Plowman et al. | |
| 5,810,509 A | 9/1998 | Nahlik, Jr. | |
| 5,858,231 A | 1/1999 | Drori | |
| 6,251,269 B1 | 6/2001 | Johnson et al. | |
| 6,270,663 B1 | 8/2001 | Happel | |
| 6,428,692 B2 * | 8/2002 | Happel | ....................... 210/155 |
| 6,780,310 B1 * | 8/2004 | Howe | ......................... 210/155 |
| 6,869,528 B2 * | 3/2005 | Pank | .......................... 210/170 |

* cited by examiner

Primary Examiner—Frederick L. Lagman
(74) Attorney, Agent, or Firm—William M. Hobby, III

(57) ABSTRACT

A method of making a golf course green drainage system and the system made from the process which includes forming a drainage system field in a golf course green and coupling a drain pipe to the drain field for channeling water collected from the drain field. The process includes selecting a filter system having an inlet and a discharge for filtering water from the golf course green drainage field and placing the selected filter underground remotely from the golf course green and connecting the drain pipe thereto. The filter system discharge is connected to a retention pond so that water collected on a golf course green drainage field is filtered prior to being fed into the retention pond. The process includes selecting a filter having a housing and a hydrocarbon absorbent filter medium therein having a filter screen covering over the hydrocarbon absorbent medium and having a water deflector adjacent the inlet.

4 Claims, 1 Drawing Sheet

GOLF COURSE GREEN STORM WATER FILTER

BACKGROUND OF THE INVENTION

This patent application is a continuation application of my pending U.S. patent application Ser. No. 10/385,929 filed Mar. 11, 2003 now abandoned for Golf Course Green Storm Water Filter.

This application relates to a golf course green storm water filter and especially to a filter system which collects excess storm water falling on a golf green and filters out pollutants and nutrients from the water as well as traps any debris which might get into the water being drained from the green.

Ground water from heavy rains and melted snow is collected on golf course greens and the excess water must be drained from the green to keep the golf course green in playing condition. To accomplish this, drain fields are located beneath the grass on the green to capture and feed water from the green. However, the green must be fertilized and mowed on a regular basis as well as treated for insects and pests. The water falling on the greens during rain, storms and snowstorms and sprinkler systems collects nutrients not already absorbed by the grass and feeds the water having dissolved nutrients, pesticides and other contaminants therein from the drain field beneath the green to a drain pipe where it is fed to a collection basin for the water or to a lake or pond located within or adjacent the golf course. This results in an excess of pollutants and nutrients feeding into the collection basin and filters into the earth, encouraging the growth of weeks and undesirable plants, and can contaminate the ground.

The present invention is directed towards a golf course green storm water filter system which filters out a large portion of the nutrients as well as pesticides, insecticides and other contaminants from the water being fed from the green prior to the water entering into a collection basin.

In the past, related problems have been encountered in storm drain systems where ground water from heavy rain or melted snow is collected in storm sewer catch basins and flows into an underground storm drain or sewage line. The water flows into the basin through openings in a grate placed on top of the basin to prevent larger solids from entering the basin. Conventional storm sewer filters remove solids from the water before the water flows into the catch basin. These filters are typically made of a porous material and located above grate level and mainly capture debris, such as grass cuttings and the like.

One prior art U.S. Pat. No. 6,270,663 to Applicant is for a storm drain filter system which is placed beneath the grate of the entrance to a storm water catch basin and especially to a filter system which collects the entering storm water and filters out hydrocarbons, such as automobile oil, sand, and debris, such as grass clippings, from the storm water to provide a cleaner water to the storm pipe by passing the drainage water onto an oil filter boom and then into a container having fine screen filter outlets at the bottom and courser screen filters on the sides and having an overflow opening near the top of the container.

The present invention is directed towards a golf course green storm water filter system and especially to a filter system which will remove nutrients, insecticides, and pesticides from the water being drained from a golf course green. Soluble nutrients, such as phosphorous and nitrogen compounds, are difficult to remove from the water and they are especially prevalent in the water since golf greens must be fertilized in an aggressive schedule.

BRIEF DESCRIPTION OF THE DRAWINGS

Other objects, features, and advantages of the present invention will be apparent from the written description and the drawings in which.

SUMMARY OF THE INVENTION

A method of making a golf course green drainage system includes forming a drainage system field in a golf course green and coupling a drain pipe to the drain field for channeling water collected from the drain field. The process includes selecting a filter system having an inlet and a discharge for filtering water from the golf course green drainage field and placing the selected filter underground remotely from the golf course green and connecting the drain pipe thereto. The filter system discharge is connected to a retention pond or the like so that water collected on a golf course green drainage field is filtered prior to being fed into the retention pond. The process includes selecting a filter having a housing and a hydrocarbon absorbent filter medium therein having a filter screen covering over the hydrocarbon absorbent medium and having a water deflector adjacent the inlet.

A golf course green drainage system includes a golf course water drainage field located in a golf course green and coupled to a drain pipe for draining water from the golf course green. A filter system has an inlet and an outlet and is connected to a drain pipe for receiving and filtering water from the golf course green. The filter system has a hydrocarbon absorbent filter medium therein positioned for removing hydrocarbons from the water passing therethrough and discharges the water into a retention pond, or the like. The hydrocarbon filter medium includes a cellulose fiber material therein. The filter system may also have a water deflector located adjacent the inlet and filter screens covering the hydrocarbon filter medium.

DESCRIPTION OF THE PREFERRED EMBODIMENT

Figure 1:
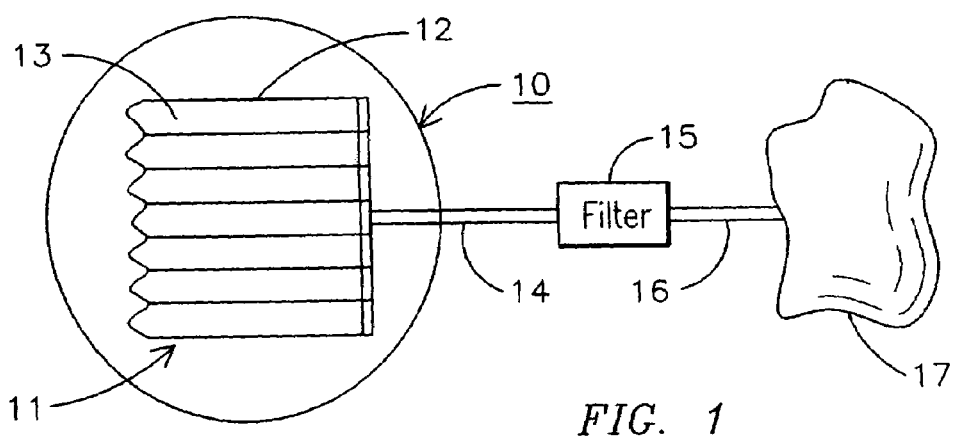
FIG. 1 is a diagrammatic view of a golf course green drainage and filter system.
Figure 2:
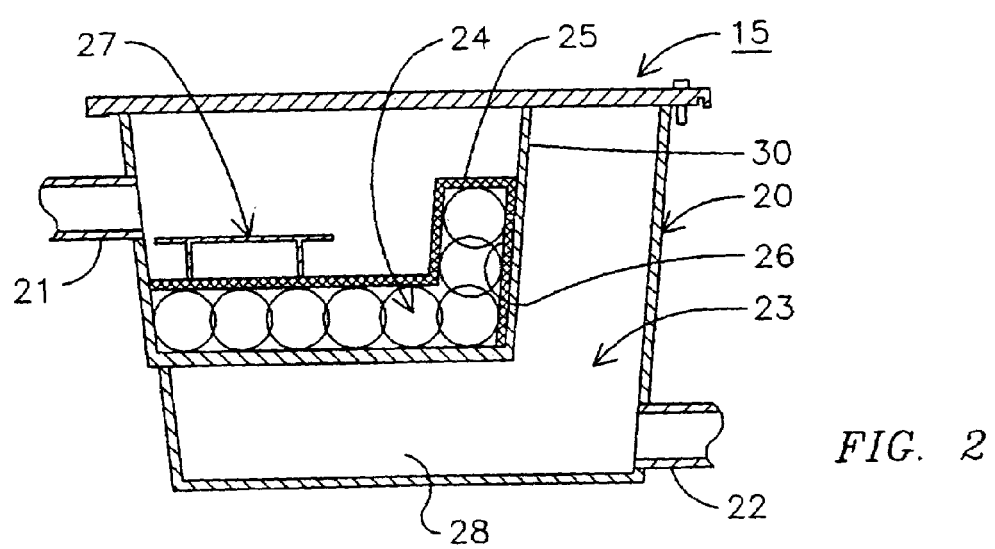
FIG. 2 is a sectional view of the filter system of FIG. 1.
Figure 3:
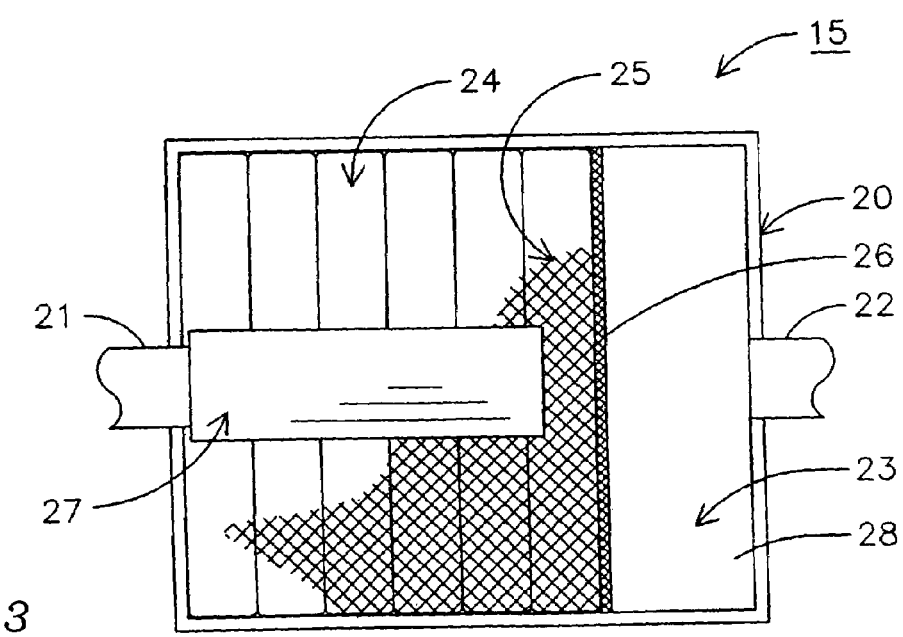
FIG. 3 is a sectional view of the filter of FIGS. 1 and 2.

The present invention is directed towards a golf green storm water drainage and filter system, as shown in FIGS. 1–3. The golf green 10 has a drainage field 11 buried beneath the grass which can consist of a plurality of plastic or ceramic pipes 12 having openings therein and which may be mounted in a field of gravel 13. The drainage field 11 is interconnected to a central drain pipe 14 for directing accumulated water thereinto into the central filter 15 and from the central filter 15 through a drainage pipe 16 into a collection basin or pond 17. The drainage field 11 is covered with sod with special grasses for a golf green, which grasses must be heavily fertilized to maintain their condition and must be sprayed on a regular basis with insecticides and the like. When the green 10 is rained upon or snowed upon or even watered from a sprinkler system, the water collects the nutrients from the fertilizer, which fertilizer is only partially absorbed by the grass. The water entering the drain field 11 may contain substantial nutrients, such as nitrogen compounds, phosphates, and the like, as well as insecticides. The drain field 11 is required to keep the golf course dry and in playing condition and feeds the excess water through the central drain pipe 14. The filter system 15 is more clearly shown in FIGS. 2 and 3 and has a main collection container 20 having an inlet 21 and an outlet 22. The interior 23 of the container 20 has a plurality of individually mounted absorbent filter booms 24 enclosed in hold-down screen 25 supported on an internal screen landing ledge 26. A flow deflector 27 is mounted just beneath the inlet 21 for deflecting the entering water to spread it out over the hold-down screen 25 and over the absorbent filter booms 24. Water entering the inlet 21 is deflected by the deflector 27 over the hold-down screen 25 and filter booms 24 where it filters into bottom 28 of the container 20 and into the outlet 22. An overflow screen portion 30 extends above the filter booms 24 to allow an overflow in the case the filter system gets overloaded with the material filtering through the filter booms 24 or in case too much waste water enters through the inlet during a short period of time. The waste water is not forced through the filter media but runs over the top overflow portion 30. This allows a by-pass mode of operation if the filter becomes clogged. However, as the water accumulates above the filter, the water pressure on the filter increases until the level reaches the overflow. Hydrocarbons can still be absorbed from the water during overflow by contact with the filter media as it passes over the top of the filter.

Filter booms 24 use as a filter medium a degradable absorbent material made from cellulose fiber materials having minimal inorganic solids content as illustrated in the Phillips U.S. Pat. Nos. 5,091,245 and 4,931,139. This absorbent material is hydrophilic by nature and has a relatively low bulk density and is made from waste cellulose materials of the type commonly generated in wood pulping or paper making operations. Waste cellulose fibers of this type have a relatively low content of inorganic solids and are relatively degradable. The resulting absorbent material is readily absorbent of oils and hydrocarbons as well as fine solid particles and may be mixed with 10% coconut activated charcoal in each of the booms 24. Thus, a homogenized mixture of 90% of the absorbent cellulose material mixed with the activated charcoal has been shown to remove a wide variety of products. A larger amount of activated charcoal may also be used. In one set of tests, the total nitrogen removed was 96% while the total phosphorous removed was also 96% and the oil and grease removed was approximately 55%. The materials are especially effective in removing insecticides and herbicides as well as organic solvents, alcohols, polymers, paints, coolants, oils and fuels and the like. In addition, the filters are primarily pulp material which are considered safe. The combination of the filter system in accordance with FIGS. 2 and 3 is placed in a golf course green drainage system utilizing a degradable cellulose absorbent filter protects the drainage basins and pond and the ground water from the accumulation of soluble nutrients as well as insecticides and herbicides. The filter booms may be readily changed when they become clogged with materials.

We claim:

1. A method of making a golf course green drainage system comprising:

forming a drainage system field in a golf course green;

coupling a first drain pipe to said drainage system field for channeling water collected from said drain field;

selecting a filter system having a housing having an inlet and an outlet for filtering water from said golf course green drainage field and including a screen filter covering a hydrocarbon absorbent filter medium therein mounted in said housing and shaped to form an overflow passage above said screen filter covering and said filter system having a water deflector adjacent the inlet thereto;

placing said selected filter system underground remote from said golf course green;

connecting said drain pipe to said remote underground filter system; and discharging said selected filter system water from said filter system discharge into a retention pond; whereby water collected in a golf course green drainage field is filtered prior to being fed into a retention pond.

2. The method of making a golf course green drainage system in accordance with claim 1 including the step of connecting a second drain pipe from said filter system outlet to a retention pond.

3. The method of making a golf course green drainage system in accordance with claim 2 in which the step of forming a drain field in a golf course green includes placing a series of pipes in a parallel layout each positioned to direct water into a collection pipe and into said first drain pipe.

4. The method of making a golf course green drainage system in accordance with claim 3 in which the step of forming a drain field in a golf course green by placing of pipes in a parallel layout includes placing a series of parallel clay pipes in the golf course green.

* * * * *